UNITED STATES PATENT OFFICE.

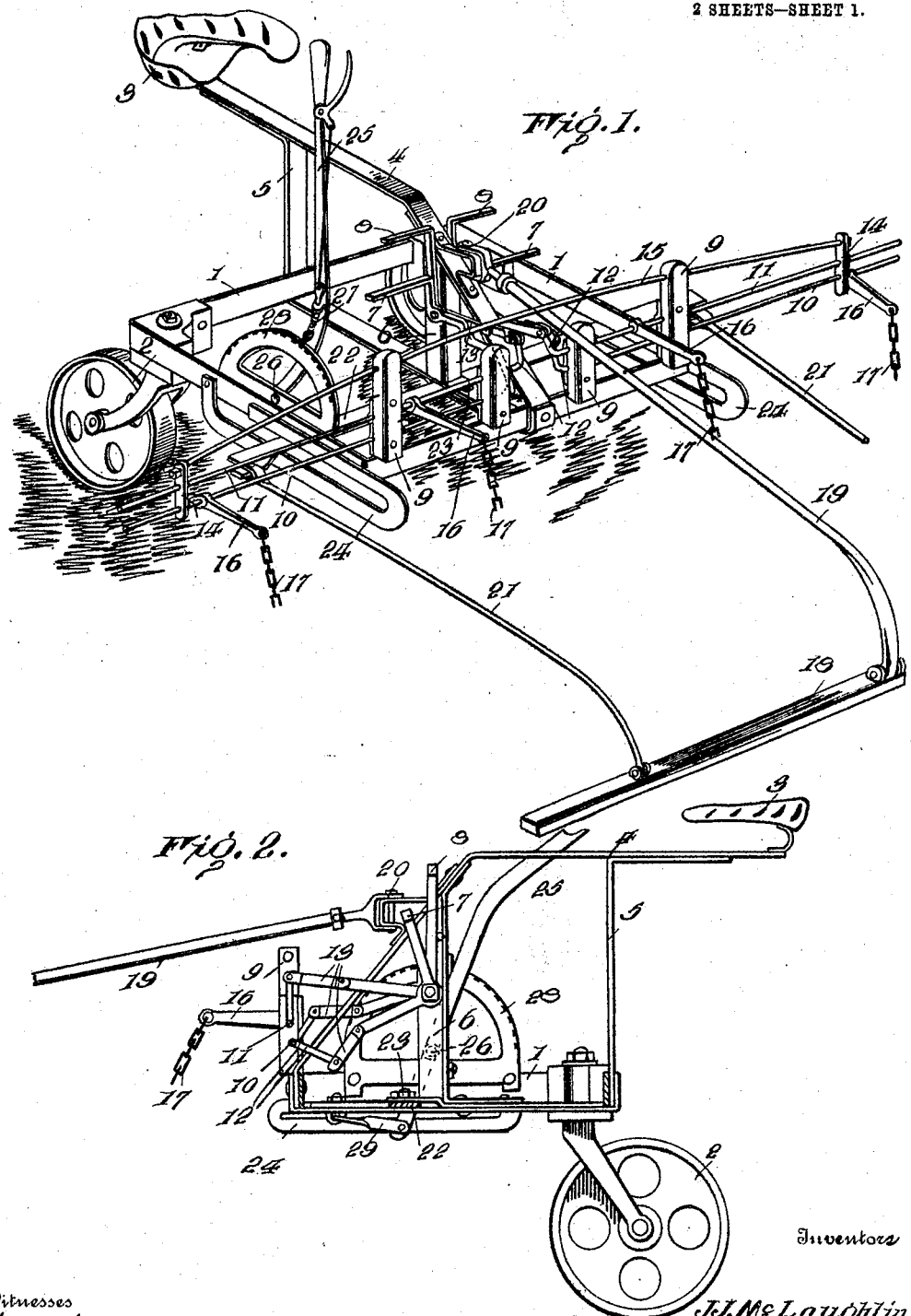

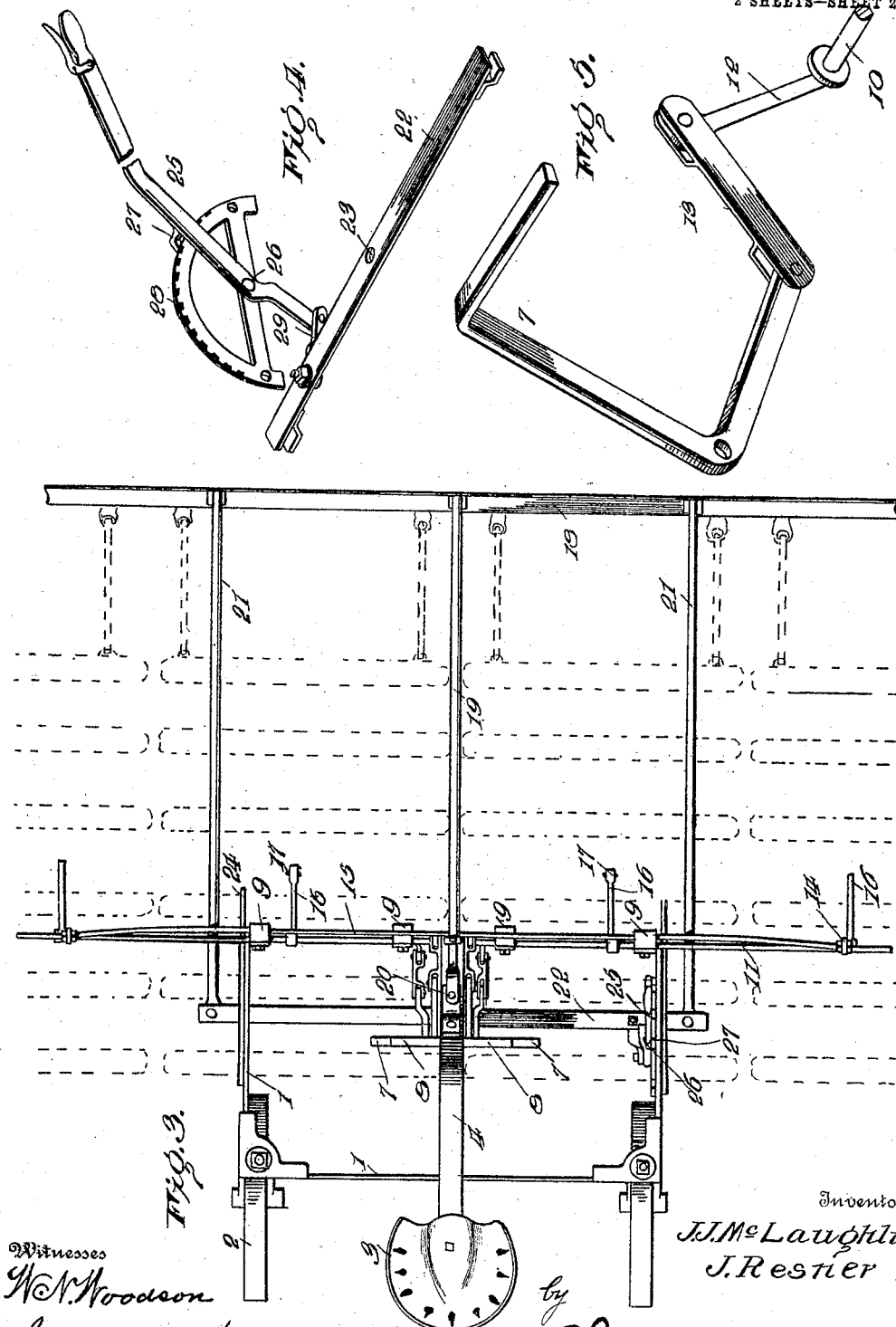

JOHN J. McLAUGHLIN AND JOHN RESNER, OF SCOTLAND, SOUTH DAKOTA.

SULKY ATTACHMENT FOR HARROWS.

No. 800,317. Specification of Letters Patent. Patented Sept. 26, 1905.

Application filed December 29, 1904. Serial No. 238,802.

*To all whom it may concern:*

Be it known that we, JOHN J. MCLAUGHLIN and JOHN RESNER, citizens of the United States, residing at Scotland, in the county of Bonhomme and State of South Dakota, have invented certain new and useful Improvements in Sulky Attachments for Harrows, of which the following is a specification.

This invention relates to agricultural implements, and embodies an attachment designed for use in connection with harrows of sectional construction particularly.

The attachment comprises suitable means for operating the different sections of the harrow independently of one another in order to throw said sections into and out of action, as necessary in the practical use of the implement.

In addition to the special operating means used for the above purpose the invention consists in the provision of peculiar means for changing the position of the attachment relative to the harrow in order to avoid obstacles which may be located in the path of travel of the implement.

For a full description of the invention and the merits thereof and also to acquire a knowledge of the details of construction of the means for effecting the result reference is to be had to the following description and accompanying drawings.

While the invention may be adapted to different forms and conditions by changes in the structure and minor details without departing from the spirit or essential features thereof, still the preferred embodiment thereof is shown in the accompanying drawings, in which—

Figure 1 is a perspective view of an attachment embodying the invention. Fig. 2 is a vertical longitudinal sectional view of the attachment. Fig. 3 is a plan view, the harrow construction being shown in dotted lines. Fig. 4 is a detail perspective view showing the actuating-bar by which the position of the attachment relative to the harrow is regulated and the operating means therefor. Fig. 5 is a detail perspective view of one of the foot-levers and its connection with the rock-shafts operated thereby.

Corresponding and like parts are referred to in the following description and indicated in all the views of the drawings by the same reference characters.

The attachment mainly comprises a suitable supporting-frame of approximately rectangular formation, as indicated at 1 in the drawings. This frame 1 is mounted upon caster-wheels 2, located adjacent the rear end of the frame at opposite sides thereof. A suitable seat 3 for the operator is provided upon the frame 1, said seat being carried by a rearwardly-extending standard 4, braced at 5. The front end of the standard 4 extends downwardly and is secured to the front portion of the frame 1 in a manner which will be readily apparent. A vertical supporting member 6 also braces the member 4 adjacent its front end, and this vertical member 6 has pivoted thereto a plurality of foot-levers 7 and 8, designed to actuate the sections of the harrow in effecting proper adjustment of the latter. The foot-levers 7 and 8 are of bell-crank formation, having lateral extensions against which the operator may place his feet in order to actuate the same.

The front of the frame 1 carries a plurality of vertical arms 9, in which are mounted a plurality of rock-shafts 10 and 11, the shafts 11 being disposed above the shafts 10, and all of the shafts are carried in suitable bearings upon the arms 9 aforesaid. The shafts 10 and 11 are provided with crank-arms 12, and the uppermost shafts 11 are connected by links 13 with the foot-levers 8, whereas the crank-arms 12 of the lowermost shafts 10 are likewise connected by members 13 with the foot-levers 7. The crank-arms 12 are located at the adjacent extremities of the rock-shafts 10 and 11, so that the various connections between the shafts and foot-levers are assembled centrally of the frame 1, thus giving compactness and rigidity to the parts. Each of the rock-shafts 10 and 11 is supported adjacent its outer end by means of a bearing-plate 14, pendent from a truss-rod 15, which passes through the upper ends of the end arms 9. The rod 15 is utilized to brace the arms 9 and to afford a support for the bearing members 14 aforesaid. The rock-shafts 10 and 11 are connected each with a single section of the harrow, (indicated in dotted lines in Fig. 3,) and for this purpose a rock-arm 16 is carried by each shaft 10 and 11, said rock-arm being adjustable longitudinally of its respective shaft and connected with a respective harrow-section, to which it is attached by means of a flexible connection 17, such as a chain or the like. The adjustability of the rock-arm 16 is advantageous in that the adjustment comprising the invention is thus made susceptible of application to harrows of different sizes. The rock-arms 16 are held in adjusted position by any desirable means, such as set-screws or the like.

From the foregoing it will be noted that at the will of the operator, who is seated upon the seat 3, any one of the foot-levers 7 and 8 may be actuated in order to thereby tilt the respective rock-shafts 10 and 11 with which it is connected. A tilting movement of any one or more of the rock-shafts 10 and 11 will impart a rocking or pivotal movement to the arm 16 carried thereby, and since this arm is connected by the part 17 with an ascertained section of the harrow it will be clear that such section may be raised or lowered in order to throw it out of operation temporarily or to drop material which may clog the harrow-teeth and prevent perfect working of the implement.

The attachment is connected with a draft-bar 18 of the harrow by means of a centrally-connected bar 19, secured at its front end to the draft-bar 18 at a point between the ends of the latter and attached at its rear end by a swivel connection 20 to the standard 4, projecting upwardly from the frame 1. The rod or bar 19 affords the main connection between the attachment and the harrow. However, rods 21 are utilized to afford a further connection, said rods 21 being attached at their forward ends near the ends of the draft-bar 18 of the harrow, and the rear ends of the rods 21 are pivotally secured to the actuating-bar 22, pivoted to the frame 1 of the attachment, as shown at 23, at a point between its ends. The actuating-bar 22, which is connected at its ends to the rods 21, is adapted for pivotal movement upon the frame of the attachment, and guides 24 are arranged longitudinally of the side bars of the frame 1, so as to receive the actuating-bar 22 near its ends and direct its movement in a horizonal plane.

An operating-lever 25 is pivoted to one side of the frame 1, as shown at 26, and this lever 25 is provided with a latch device 27 of common construction, coöperating with a segment 28, attached to the frame 1 in any substantial manner. The lever 25 projects downwardly from the point of pivotal connection 26 thereof, and its lower end is connected by means of a link 29 to the actuating-bar 22. (See Fig. 4 of the drawings.) A pivotal movement of the lever 25 is designed to impart a similar movement to the actuating-bar 22, and such movement of the latter, owing to the positive connection of the frame of the attachment with the draft-bar 18 of the harrow, will throw the attachment to one side or the other, so that any obstacles which may be located in the path of travel may be readily avoided at the desire of the operator.

The attachment hereinbefore set forth is comparatively simple in construction and admits of ease of operation of the sections of the harrow not heretofore attained by devices of this nature now in use. Further, the attachment is designed for use upon almost any type of harrow, being broadly susceptible of application to implements of this class.

Having thus described the invention, what is claimed as new is—

1. In an attachment of the class described, the combination of a supporting-frame, a transverse draft-bar, means connecting the draft-bar at a point between its ends with the supporting-frame, a transversely-mounted actuating-bar carried by the supporting-frame, rods connecting the ends of the actuating-bar with end portions of the draft-bar, and a lever operably connected with the actuating-bar.

2. In an attachment of the class described, the combination of a supporting-frame, longitudinal guides at opposite sides of the supporting-frame, a transverse draft-bar, a transverse actuating-bar mounted in the longitudinal guides of the supporting-frame, connecting means between the ends of the draft and actuating bars, other connecting means between the supporting frame and the draft-bar, and means for operating the actuating-bar.

3. In an attachment of the class described, the combination of a supporting-frame provided with spaced longitudinal guides, an actuating-bar pivoted to the supporting-frame at a point between its ends and having its end portions mounted for movement in the longitudinal guides aforesaid, a draft-bar arranged transversely of the supporting-frame, rods connecting the ends of the draft and actuating bars, a lever pivoted to the supporting-frame and operably connected with the actuating-bar, and means for positioning the lever at an ascertained adjustment.

4. In an attachment of the class described, the combination of a supporting-frame embodying supporting-wheels, an actuating-bar mounted transversely upon said frame, a draft-bar, connecting means between the end of the actuating-bar and the draft-bar, and means for imparting pivotal movement to the actuating-bar.

In testimony whereof we affix our signatures in presence of two witnesses.

JOHN J. McLAUGHLIN. [L. S.]
JOHN RESNER. [L. S.]

Witnesses:
ROBERT DOLLARD,
BIRT JOHNSTON.